(12) United States Patent
Mullick et al.

(10) Patent No.: US 7,995,864 B2
(45) Date of Patent: Aug. 9, 2011

(54) METHOD AND SYSTEM FOR PERFORMING IMAGE REGISTRATION

(75) Inventors: Rakesh Mullick, Bangalore (IN); Sohan Rashmi Ranjan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1070 days.

(21) Appl. No.: 11/772,975

(22) Filed: Jul. 3, 2007

(65) Prior Publication Data

US 2009/0010540 A1  Jan. 8, 2009

(51) Int. Cl.
*G06K 9/52* (2006.01)

(52) U.S. Cl. .......................... 382/294; 382/128

(58) Field of Classification Search ................... 382/131, 382/170, 294
See application file for complete search history.

(56) References Cited

U.S. PATENT DOCUMENTS

| | | | |
|---|---|---|---|
| 7,397,934 B2 * | 7/2008 | Bloch et al. | 382/128 |
| 7,715,654 B2 * | 5/2010 | Chefd'hotel et al. | 382/294 |
| 2001/0036302 A1 * | 11/2001 | Miller | 382/128 |
| 2005/0031176 A1 * | 2/2005 | Hertel et al. | 382/128 |
| 2006/0056701 A1 | 3/2006 | Unal et al. | |
| 2007/0223794 A1 * | 9/2007 | Preiss et al. | 382/128 |
| 2008/0281181 A1 * | 11/2008 | Manzione et al. | 600/407 |

FOREIGN PATENT DOCUMENTS

WO   2006011935 A2   2/2006

OTHER PUBLICATIONS

Pending U.S. Appl. No. 11/445,767 Rakesh Mullick et al. System and Method for Geometry Driven Registration pp. 1-28, Jun. 2, 2006.

* cited by examiner

*Primary Examiner* — Bhavesh M Mehta
*Assistant Examiner* — Stephen R Koziol
(74) *Attorney, Agent, or Firm* — Jason K. Klindtworth (57) ABSTRACT

A method for performing image registration is provided. The method comprises obtaining a reference image dataset and a target image dataset and defining an image mask for a region of interest in the reference image dataset. The method further comprises registering a corresponding region of interest in the target image dataset with the image mask, using a similarity metric, wherein the similarity metric is computed based on one or more voxels in the region of interest defined by the image mask.

26 Claims, 5 Drawing Sheets

METHOD AND SYSTEM FOR PERFORMING IMAGE REGISTRATION

BACKGROUND

The invention relates generally to the field of image registration, and more particularly to a method and system for efficiently registering images obtained via a plurality of imaging modalities.

Image registration refers to the process of finding a correspondence between the contents of two or more images. In particular, image registration refers to a process of finding a geometric transform that non-ambiguously links locations and orientations of objects or parts of objects in different images.

Image registration finds wide application in medical imaging, video motion analysis, remote sensing, security and surveillance applications. In the field of medical imaging, a patient is generally subjected to numerous scans over a number of imaging sessions. These scanned images (such as, for example, of a body part) may be obtained either temporally from the same imaging modality or system or may be captured via different imaging modalities, such as, for example, X-ray imaging systems, magnetic resonance (MR) imaging systems, computed tomography (CT) imaging systems, ultrasound imaging systems, positron emission tomography (PET) imaging systems and so forth. For example, PET imaging systems and single photon emission computed tomography (SPECT) imaging systems may be used to obtain functional body images which provide physiological information, while CT imaging systems and MR imaging systems may be used to acquire structural images of the body which provide anatomic maps of the body.

As will be appreciated by those skilled in the art, the use of different imaging modalities generates image data sets with complementary information. Hardware based registration techniques are typically useful for performing multi-modality imaging of static structures. However, for the imaging of dynamic structures, such as the heart, software based registration is additionally required to ensure a quality match. For example, in the diagnosis of cardio-vascular diseases for a patient, it may be necessary to jointly visualize and correlate coronary vasculature obtained from a CT imaging system with functional information obtained from a PET/SPECT imaging system. However, the image acquisition of dynamic structures using different modalities often has different scan durations and scan phases thereby, producing dissimilar information content. Further, large field-of-view (FOV) differences and varying resolutions between different imaging modalities may prevent the accurate correlation of these images resulting in inaccurate diagnosis of patient information.

It would be desirable to develop a technique for efficiently and accurately registering images obtained via a plurality of imaging modalities. In addition, it would be desirable to jointly visualize image data sets obtained from different imaging modalities by reliably coalescing the image data sets, to facilitate the generation of a composite, overlapping image that may include additional clinical information, which may not be apparent in each of the individual image data sets.

BRIEF DESCRIPTION

In one embodiment, a method for performing image registration is provided. The method comprises obtaining a reference image dataset and a target image dataset and defining an image mask for a region of interest in the reference image dataset. The method further comprises registering a corresponding region of interest in the target image dataset with the image mask, using a similarity metric, wherein the similarity metric is computed based on one or more voxels in the region of interest defined by the image mask.

In another embodiment, an imaging system is provided. The imaging system is configured to obtain a reference image dataset and a target image dataset. A processing module is operationally coupled to the imaging system. The processing module is configured to define an image mask for a region of interest in the reference image dataset. The processing module is further configured to register a corresponding region of interest in the target image dataset with the image mask, using a similarity metric, wherein the similarity metric is computed based on one or more voxels in the region of interest defined by the image mask.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
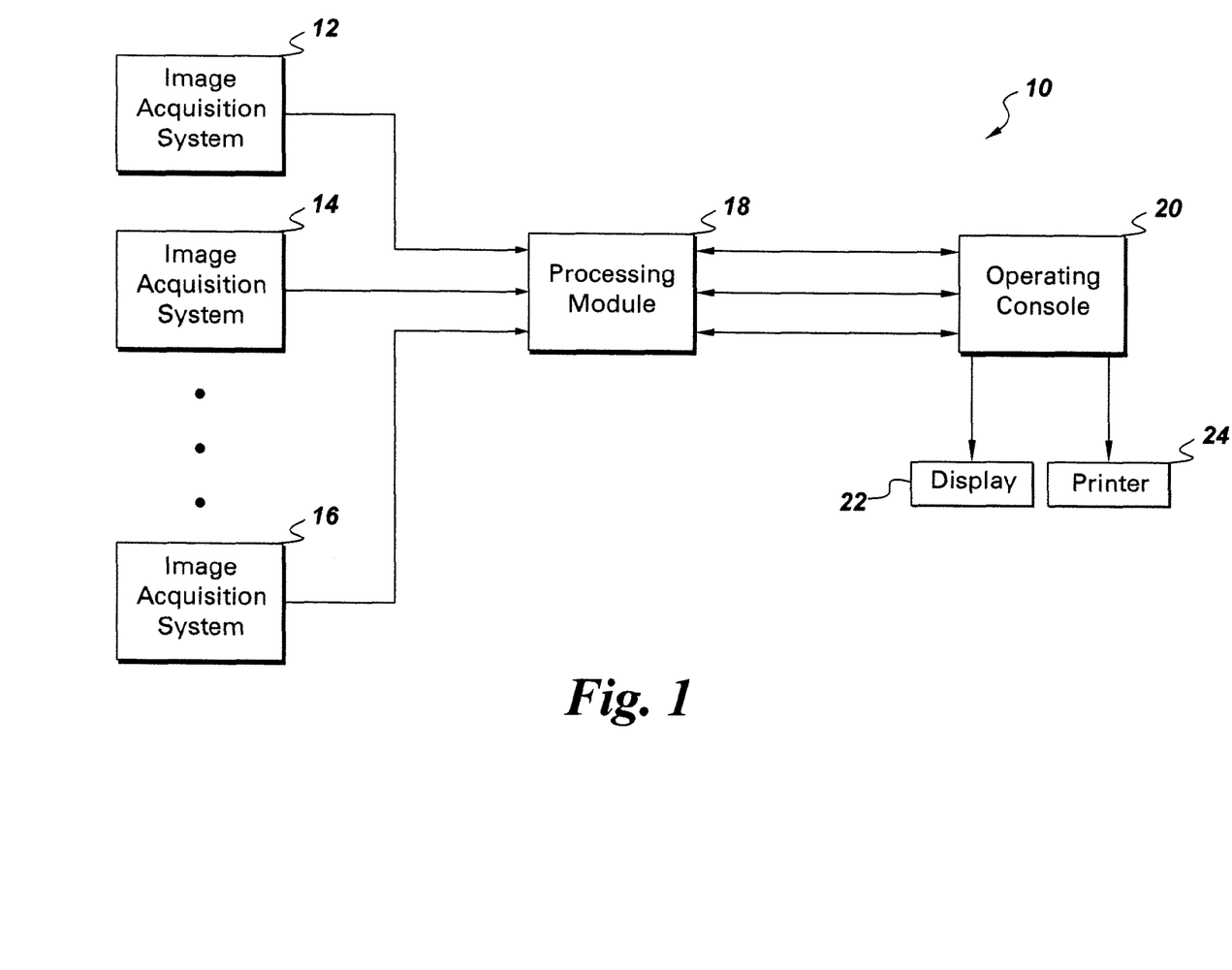
FIG. 1 is a block diagram of an exemplary imaging system, in accordance with one embodiment of the invention.

FIG. 1 is a block diagram of an exemplary imaging system, in accordance with one embodiment of the invention. The imaging system 10 may be configured to facilitate acquisition of image data from a patient (not shown) via a plurality of image acquisition systems. Although, the illustrated embodiments are described in the context of a medical imaging system, it will be appreciated that the imaging system 10 may also be used in industrial applications, such, for example, baggage scanning applications, and other security and surveillance applications.

Referring to FIG. 1, the imaging system 10 is illustrated as including a first image acquisition system 12, a second image acquisition system 14 and an $N^{th}$ image acquisition system 16. It may be noted that the first image acquisition system 12 may be configured to obtain a first image dataset representative of the patient under observation. In a similar fashion, the second image acquisition system 14 may be configured to facilitate acquisition of a second image dataset associated with the same patient, while the $N^{th}$ image acquisition system 16 may be configured to facilitate acquisition of an $N^{th}$ image dataset from the same patient.

In one embodiment, the imaging system 10 is representative of a multi-modality imaging system. In other words, a variety of image acquisition systems may be employed to obtain image data representative of the same patient. More particularly, in certain embodiments each of the first image acquisition system 12, the second image acquisition system 14 and the $N^{th}$ image acquisition system 16 may include a CT imaging system, a PET imaging system, an ultrasound imaging system, an X-ray imaging system, an MR imaging system, an optical imaging system or combinations thereof. For example, in one embodiment, the first image acquisition system 12 may include a CT imaging system, while the second image acquisition system 14 may include a PET imaging system and the $N^{th}$ image acquisition system 16 may include an ultrasound imaging system. It may be noted that it is desirable to ensure similar dimensionality of the various image acquisition systems in the multi-modality imaging system 10. In other words, in one embodiment, it is desirable that in the multi-modality imaging system 10, each of the various image acquisition systems 12, 14, 16 includes a two-dimensional image acquisition system. Alternatively, in certain other embodiments, the multi-modality imaging system 10 entails use of three-dimensional image acquisition systems 12, 14, 16. Accordingly, in the multi-modality imaging system 10, a plurality of images of the same patient may be obtained via the various image acquisition systems 12, 14 and 16.

Further, in certain other embodiments, the imaging system 10 may include one image acquisition system, such as the first image acquisition system 12. In other words, the imaging system 10 may include a single modality imaging system. For example, the imaging system 10 may include only one image acquisition system 12, such as a CT imaging system. In this embodiment, a plurality of images, such as a plurality of scans taken over a period of time, of the same patient may be obtained by the same image acquisition system 12.

The plurality of image datasets representative of the patient that have been obtained either by a single modality imaging system or by different image acquisition modalities may then be merged to obtain a combined image. As will be appreciated by those skilled in the art, imaging modalities such as PET imaging systems and single photon emission computed tomography (SPECT) imaging systems may be employed to obtain functional body images which provide physiological information, while imaging modalities such as CT imaging systems and MR imaging systems may be used to acquire structural images of the body which provide anatomic maps of the body. As mentioned above, these different imaging techniques are known to provide image data sets with complementary and occasionally conflicting information regarding the body. In accordance with embodiments of the present invention, the image datasets obtained from different imaging modalities are combined to generate a composite, overlapping image that may include additional clinical information, which may not be apparent in each of the individual image data sets. More particularly, the composite image facilitates clinicians to obtain information regarding shape, size and spatial relationship between anatomical structures and any pathology, if present.

Referring to FIG. 1 again, the plurality of acquired image datasets may be registered to generate a composite image to facilitate clinicians to compare or integrate data representative of the patient obtained from different measurements. In one embodiment, one or more image registration techniques may be utilized to coalesce the plurality of image sets obtained by the imaging system 10 via the processing module 18. In the example illustrated in FIG. 1, the processing module 18 is operatively coupled to the image acquisition systems 12, 14, 16 and is configured to facilitate the registration of the plurality of acquired image datasets to generate a composite, registered image. In a particular embodiment, and as will be described in greater detail below, the processing module 18 is configured to define an image mask for a region of interest in a reference image dataset. The processing module 18 is further configured to register a corresponding region of interest in a target image dataset with the image mask, using a similarity metric, wherein the similarity metric is computed based on one or more voxels in the region of interest defined by the image mask. The processing module 18 may be accessed and/or operated via an operator console 20. The operator console 20 may also be employed to facilitate the display of the composite registered image generated by the processing module 18, such as on a display 22 and/or a printer 24. For example, an operator may use the operator console 20 to designate the manner in which the composite image is visualized on the display 22. Operator console 20 may be equipped to include a user interface that is responsive to user inputs for visualization and display preferences.

Figure 2:
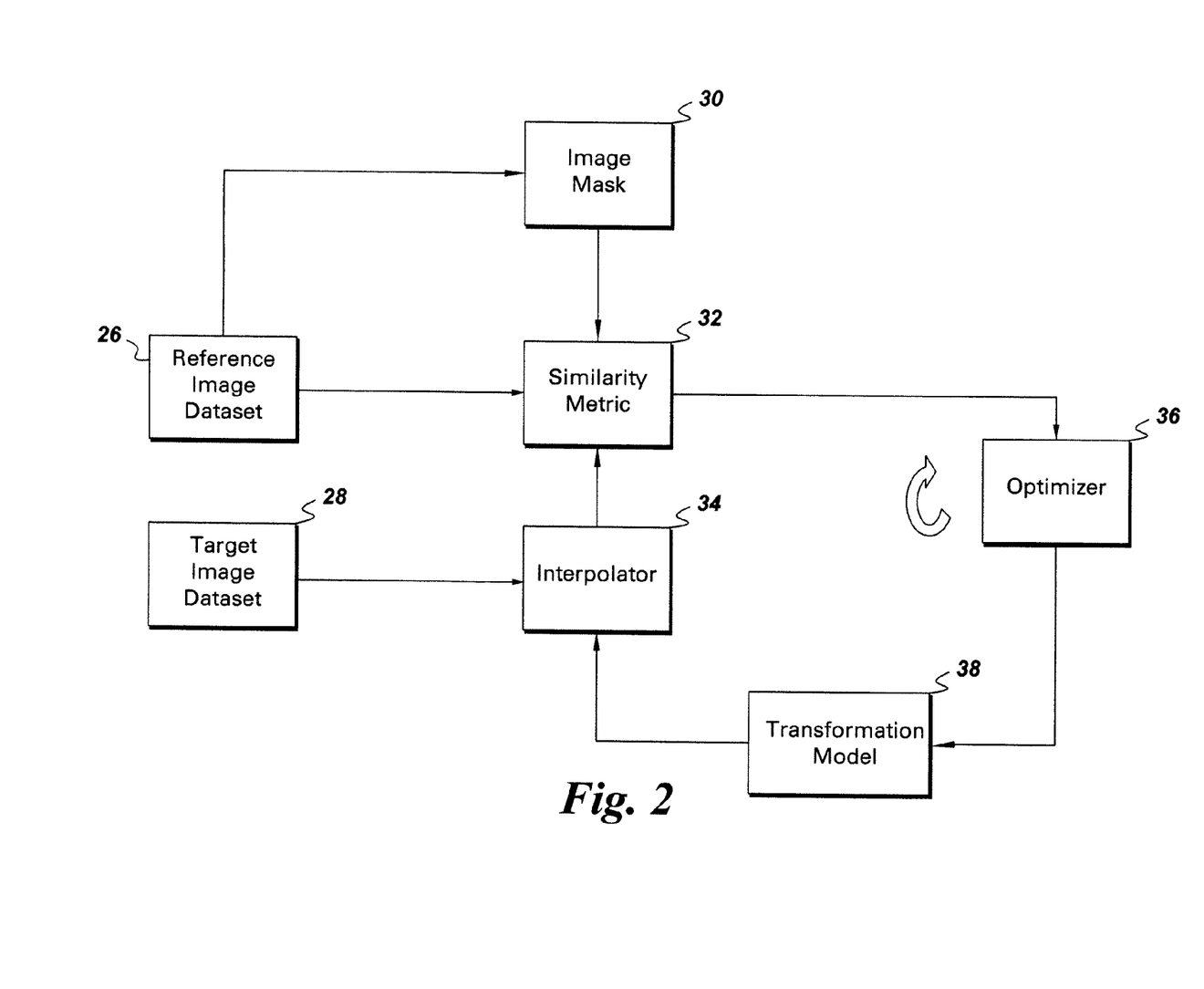
FIG. 2 is high-level process for performing image registration based on an image mask, using the imaging system shown in FIG. 1, in accordance with one embodiment of the present invention.

FIG. 2 is high-level process for performing image registration based on an image mask, using the imaging system shown in FIG. 1, in accordance with one embodiment of the present invention. As mentioned above, image registration refers to a process of transforming different image datasets into a common coordinate system. More particularly, the process of image registration involves finding one or more suitable transformations that may be employed to transform the image datasets under study to a common coordinate system.

Referring to FIG. 2, the image datasets include a reference image dataset 26, and at least one target image dataset 28. As used herein, a "reference image dataset" refers to an image that is unchanged and thereby used as a reference. It may be noted that the terms reference image, original image, source image and fixed image may be used interchangeably. Additionally, the other acquired images to be mapped onto the reference image dataset may be referred to as "target" image datasets. In other words, the target image dataset embodies the image that is geometrically transformed to spatially align with the reference image dataset. It may also be noted that the terms target image, moving image, sensed image and floating image may be used interchangeably. In one embodiment, the reference image dataset 26 and a target image dataset 28 correspond to image datasets representative of a patient acquired via different imaging modalities or alternatively, image datasets acquired via a same modality but at different instants of time. In a particular embodiment, the reference image dataset 26 includes anatomical information acquired using a computed tomography (CT) imaging system and the target image dataset 28 comprises functional information acquired using a positron emission tomography (PET) imaging system. As used herein, "anatomical information" may include, for example an anatomic landscape indicative of distinct anatomical regions in a patient and "functional information" may include, for example, physiological information associated with a patient.

In accordance with embodiments of the present invention, an image mask 30 is further defined for a region of interest in the reference image dataset 26. In one embodiment, the image mask 30 corresponds to a mass of uniform intensity over a region of interest in the reference image dataset 26. In another embodiment, the image mask 30 may be an approximation of a region of interest akin to a large biopsy of tissue. Further, the region of interest defined by image mask 30 may also extend to a neighboring (for example, a dilated or expanded) region, so that boundary information associated with the region of interest may be included in the image mask.

Figure 3:
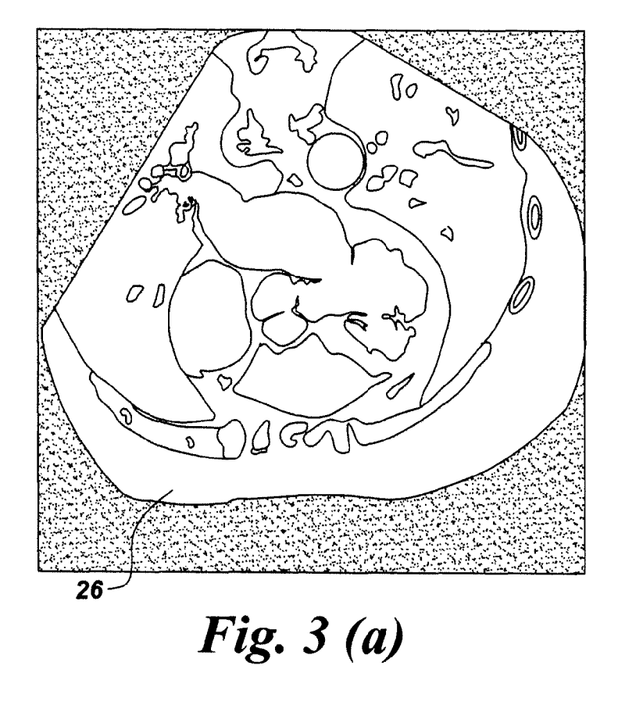
FIG. 3(a) is an illustration of a reference image dataset corresponding to an axial slice of the heart.
FIG. 3(b) is an illustration of an image mask defined for a region of interest in the reference image dataset shown in FIG. 3(a)

In a particular embodiment, the image mask 30 is a cardiac mask. FIG. 3(a) is an illustration of a reference image dataset corresponding to an axial slice of the heart. FIG. 3(b) is an illustration of an image mask defined for a region of interest in the reference image dataset shown in FIG. 3(a). In one embodiment, the image mask 30 may be defined by automatically segmenting the region of interest in the reference image dataset 26. As will be appreciated by those skilled in the art, segmentation is a process of selecting regions of interest that are a subset of a larger image volume. The segmentation into a region of interest may be based upon apriori information, such as, for example, anatomical information associated with the region of interest. As described above, an image mask is substantially automatically defined. Further, the segmentation may be performed using automatic or semi-automatic techniques. In another embodiment, the image mask may be created manually from the reference image dataset. In one embodiment, a user may also be permitted to define the image mask for a region of interest in the reference image dataset 26, using for example a user interface, which may be part of operator console 20 of FIG. 1.

In another embodiment, the image mask may also be created semi-automatically, using an image reference point. As will be appreciated by those skilled in the art, during imaging, a reference point of interest is often stored with an image. For example, in a cardiac image scan, the reference point of interest may include the co-ordinates of the apex of the image. An image mask may be created automatically from this reference point of interest, based on the dimensions of a typical heart. In yet another embodiment, the image mask may be created using an atlas based localization technique, wherein the reference image dataset is automatically registered using relevant atlas data. In particular, an atlas image of the anatomy of interest is used in order to automatically generate an image mask from the reference image. The atlas image is registered with the reference image to obtain a registered atlas image. The registered atlas image may then be used as an image mask.

Referring to FIG. 2 again, the target image dataset 28 may be geometrically transformed to spatially align with the reference image dataset 26, using a transformation model 38. The transformation model 38 locates a plurality of reference image dataset coordinates in the target image dataset 28 and aligns a plurality of pixel correspondences for a region of interest between the image datasets, to generate a registered image. As used herein, "pixel correspondences" refer to the association of two positions, one from each image dataset that reference an identical position on a feature/region of interest or object being imaged. The transformation component 38 is further configured to apply a transform to register the region of interest in the target image dataset 28 with the image mask 30 in the reference image dataset 26. The transform may include, a rigid transform or a non-rigid transform. Rigid transforms may include, for example, translations, rotations, scaling, skew or combinations thereof. Non-rigid transforms may include deformation fields generated by typical methods, for example, finite element modeling (FEM), B-splines, optic flow based (Daemon's) method, diffusion based methods, or level-set based methods.

Figure 4:
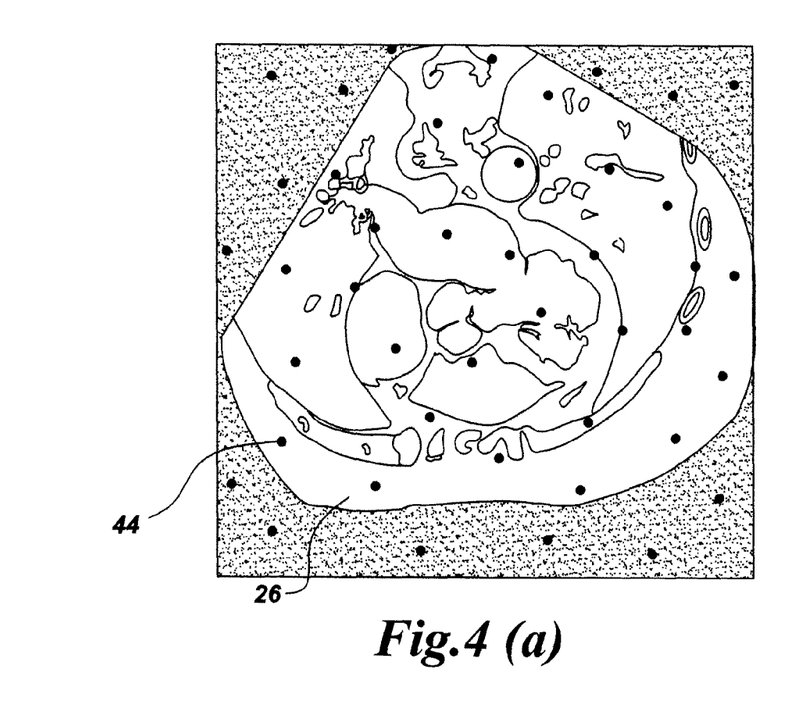
FIG. 4(a) is an illustration of a plurality of voxels present in an image volume.
FIG. 4(b) is an illustration of a plurality of voxels present in a region of interest defined by the image mask.

A similarity metric 32 quantifies the degree of correspondence between the pixels or voxels in both the reference and target image datasets that is achieved by the transformation model 38. The similarity metric 32 may include, but is not limited to, a contrast measure, minimizing means-squared error, correlation ratio, ratio image uniformity (RIU), partitioned intensity uniformity (PIU), mutual information (MI), normalized mutual information (NMI), joint histogram, or joint entropy, for example. As will be appreciated by those skilled in the art, since the computation of the similarity metric for reference and target images is computationally intensive, desirably a sample or percentage of voxels are selected randomly for metric computation, wherein the selected voxels are assumed to be statistically representative of the entire image volume. FIG. 4(a) is an illustration of a plurality of voxels present in an image volume.

Figure 4B:
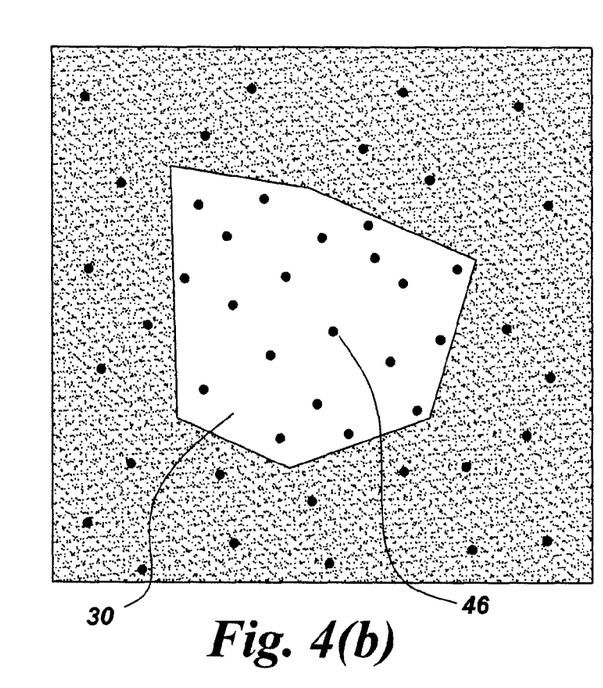

In accordance with embodiments of the present invention, the number of voxels used for metric computation is restricted to the region of interest defined by the image mask 30 in the reference image dataset. In a particular embodiment, the similarity metric 32 is computed based on a plurality of voxels within the region of interest defined by the image mask 30 as shown in FIG. 4(b). In particular, since the computation of the similarity metric is targeted to only the portion of the image volume defined by the image mask, the computation time is significantly reduced.

Accordingly, the use of the image mask results in a robust metric computation process and improves the accuracy of the image registration process and results in better alignment of images. In particular, the computation of the similarity metric is performed by sampling the voxels in the region of interest defined by the image mask. In one embodiment, all the voxels in the region of interest may be sampled to compute the similarity metric. In another embodiment, a selected percentage of voxels in the region of interest may be sampled, wherein the voxel samples may be chosen randomly. In yet another embodiment, a sequential uniform sampling of the voxels in the region of interest may be performed, by choosing voxels samples uniformly. For example, every nth voxel in a region of interest may be chosen, to generate a 100/n % sampling of the voxels. Further, in accordance with one embodiment, the anatomical information in the image mask may be weighted, wherein different sub-regions in the image mask may be assigned different weights. Further, these weights may be used in the computation of the similarity metric of the voxels in a particular sub-region. In a particular embodiment, the weights may include information about the relevance of each voxel for a particular application, and this information may be used in voxel selection and similarity metric computation. For example, in a cardiac application, the vessels may be assigned a higher weight compared to a myocardium wall tissue during computation of the similarity metric for comparing images.

In another embodiment, the process of image registration using an image mask may be viewed as a multi-scale process, that is, the registration process begins at a coarsest copy of the images, and the results of registration is re-used for registration at the next finer level, till the final image resolution is reached. This method often gives better and faster results in cases when images are grossly mis-aligned. Further, the image mask generated in accordance with embodiments of the present invention may be used to enable the joint visualization of coronary vasculature obtained from a high resolution CT system along with functional information from a PET/SPECT acquisition. The composite registered image generated may be used to aid diagnostic assessment and correlation of myocardial defects (such as for example, infact and reversible tissue and cardiovascular disease) for a patient.

Referring to FIG. 2 again, an optimizer 36 may be used to maximize the image similarity between the image datasets, by selecting a transformation parameter that optimizes the similarity metric 32. Further, an interpolator 34 may be used to approximate the set of pixel correspondences between the image datasets. As will be appreciated by those skilled in the art, it may be desirable to optimize a measure associated with the similarity metric. Accordingly, a suitable transformation parameter may be selected such that the measure associated with the similarity metric is optimized. This transformation parameter may then be employed to transform the target image dataset 28 to the reference image dataset 26 to generate a registered image.

Figure 5:
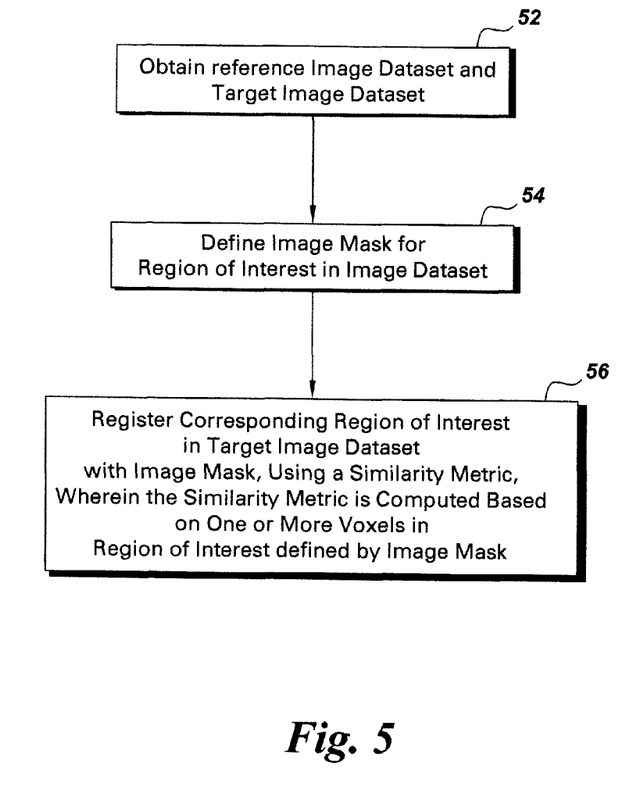
FIG. 5 is a flowchart, illustrating process steps for performing image registration, using an image mask, in accordance with one embodiment of the invention.

FIG. 5 a flowchart, illustrating process steps for performing image registration using an image mask, in accordance with one embodiment of the invention. In step 52, a reference image dataset 26 and a target image dataset 28 are obtained. In one embodiment, the reference image dataset 26 comprises anatomical information acquired using a computed tomography (CT) imaging modality and the target image dataset 28 comprises functional information acquired using a positron emission tomography (PET) imaging modality. In step 54, an image mask 30 is defined for a region of interest in the reference image dataset 26. In one embodiment, the image mask 30 is a cardiac mask. In step 56, a corresponding region of interest in the target image dataset 28 is registered with the image mask 30, using a similarity metric 32 to generate a registered image. The registered image may be further displayed to a user. In one embodiment, and as described above, the similarity metric 32 is computed based on one or more voxels in the region of interest defined by the image mask 30 in the reference image dataset 26.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for performing image registration, comprising the steps of:
    obtaining a reference image dataset and at least one other target image dataset;
    defining an image mask for a region of interest in the reference image dataset;
    differently weighting respective sub-regions within the image mask, wherein each sub-region corresponds to a different respective anatomical structure; and
    registering a corresponding region of interest in the at least one other target image dataset with the image mask, using a similarity metric, wherein the similarity metric is computed based on one or more voxels in the region of interest defined by the image mask and using the respective weights associated with each voxel.

2. The method of claim 1, wherein the reference image dataset and the at least one other target image dataset is acquired via an imaging system, wherein the imaging system comprises at least one of a computed tomography (CT) imaging system, a positron emission tomography (PET) imaging system, a magnetic resonance (MR) imaging system, an X-ray imaging system, an ultrasound imaging system, or combinations thereof.

3. The method of claim 2, wherein the reference image dataset is acquired via a first imaging modality and the at least one other target image dataset is acquired via a second imaging modality, where the second imaging modality is different from the first imaging modality.

4. The method of claim 2, wherein the reference image dataset and the at least one other target image dataset are acquired via a same imaging modality at different points in time.

5. The method of claim 2, wherein the reference image dataset and the at least one other target image dataset comprise at least one of anatomical information and functional information.

6. The method of claim 5, wherein the reference image dataset comprises anatomical information acquired using a computed tomography (CT) imaging modality and the at least one other target image dataset comprises functional information acquired using a positron emission tomography (PET) imaging modality.

7. The method of claim 1, wherein computing the similarity metric comprises sampling one or more of the voxels in the region of interest defined by the image mask.

8. The method of claim 1, comprising automatically segmenting the region of interest in the reference image dataset to define the image mask.

9. The method of claim 1, comprising automatically registering the reference image dataset using an atlas-based localization technique, to define the image mask.

10. The method of claim 1, comprising permitting a user to define the image mask for the region of interest in the reference image dataset.

11. The method of claim 1, wherein the similarity metric comprises at least one of mutual information (MI), contrast measure, minimizing means-squared error, correlation ratio, ratio image uniformity (RIU), normalized mutual information (NMI), joint histogram, and joint entropy.

12. The method of claim 1, further comprising applying at least one of a rigid transform and a non-rigid transform to register the region of interest in the at least one other target image dataset with the image mask in the reference image dataset.

13. The method of claim 1, further comprising generating a registered image.

14. The method of claim 13, further displaying the registered image to a user.

15. A system, comprising:
    at least one imaging system configured to obtain a reference image dataset and at least one other target image dataset; and
    a processing module in communication with the at least one imaging system and configured to define an image mask for a region of interest in the reference image dataset, to differently weight respective sub-regions within the image mask, wherein each sub-region corresponds to a different respective anatomical structure, and to register a corresponding region of interest in the at least one other target image dataset with the image mask, using a similarity metric, wherein the similarity metric is computed based on one or more voxels in the region of interest defined by the image mask and using the respective weights associated with each voxel.

16. The system of claim 15, wherein the imaging system comprises at least one of a computed tomography (CT) imaging system, a positron emission tomography (PET) imaging system, a magnetic resonance (MR) imaging system, an X-ray imaging system, an ultrasound imaging system, or combinations thereof.

17. The system of claim 16, wherein the reference image dataset is acquired via a first imaging modality and the at least one other target image dataset is acquired via a second imaging modality, where the second imaging modality is different from the first imaging modality.

18. The system of claim 16, wherein the reference image dataset and the at least one other target image dataset are acquired via the same imaging modality at different points in time.

19. The system of claim 16, wherein the reference image dataset and the at least one other target image dataset comprise at least one of anatomical information and functional information.

20. The system of claim 19, wherein the reference image dataset comprises anatomical information acquired using a computed tomography (CT) imaging modality and the at least one other target image dataset comprises functional information acquired using a positron emission tomography (PET) imaging modality.

21. The system of claim 15, wherein the processing module is configured to automatically segment the region of interest in the reference image dataset to define the image mask.

22. The system of claim 15, wherein the processing module is configured to automatically register the reference image dataset using an atlas-based localization technique, to define the image mask.

23. The system of claim 15, further comprising permitting a user to define the image mask for the region of interest in the reference image dataset.

24. The system of claim 15, wherein the processing module is configured to apply at least one of a rigid transform and a non-rigid transform to register the region of interest in the at least one other target image dataset with the image mask in the reference image dataset.

25. The system of claim 15, wherein the processing module is further configured to generate a registered image.

26. The system of claim 25, wherein the system further comprises a display module configured to display the generated registered image.

* * * * *